United States Patent [19]

Rodriquez

[11] Patent Number: 4,968,125
[45] Date of Patent: Nov. 6, 1990

[54] HAND-HELD MAGNIFIER DEVICE

[76] Inventor: Victor Rodriquez, 109-06 Corona Ave., Corona, N.Y. 11368

[21] Appl. No.: 390,383

[22] Filed: Aug. 7, 1989

[51] Int. Cl.$^5$ ............................................. G02B 7/02
[52] U.S. Cl. .................................. 350/518; 350/523; 350/248; D16/131
[58] Field of Search ............... 350/518, 507, 501, 248, 350/250, 239-243; D16/131

[56] References Cited

U.S. PATENT DOCUMENTS

| | | | |
|---|---|---|---|
| 42,843 | 5/1964 | Ellis | 350/239 |
| 905,063 | 11/1908 | Faehrmann | 350/242 |
| 1,175,609 | 3/1916 | Cottrell. | |
| 2,676,754 | 4/1954 | Hittle. | |
| 3,410,635 | 11/1968 | Lockwood | 350/242 |
| 3,582,181 | 6/1971 | de Chueca | 350/518 |
| 4,142,537 | 3/1979 | Fenelon. | |
| 4,815,835 | 3/1989 | Corona | 350/518 |

FOREIGN PATENT DOCUMENTS

| | | | |
|---|---|---|---|
| 1063926 | 5/1954 | France | 350/241 |
| 324463 | 9/1957 | Switzerland | 350/250 |

Primary Examiner—Jon W. Henry
Attorney, Agent, or Firm—T. M. Gernstein

[57] ABSTRACT

A hand-holdable magnifier device includes a collapsible tube section mounted on one side of a slotted base. A lens system included with the device has an objective, an ocular and a condenser whereby clear and sharp images can be obtained. The device is amenable to various configurations, such as a graduation cap or mortarboard.

2 Claims, 3 Drawing Sheets

HAND-HELD MAGNIFIER DEVICE

TECHNICAL FIELD OF THE INVENTION

The present invention relates to the general art of optics, and to the Particular field of magnifiers.

BACKGROUND OF THE INVENTION

Many people wish to view a picture, a transparency or the like in a particularly close manner. This close viewing may be to detect minor errors, to find a particular feature or the like, and is usually done with a magnifying glass of some sort.

Some magnifying glasses are quite powerful, and some are adapted to be used on a bench or a desk and thus have a clamp or base means for firmly mounting such device on a support surface.

Often, one has a need to make such a close inspection of a photograph in a location that is not convenient to mounting a clamp or a base. In such an instance, the usual magnifying glass is generally used However, due to many factors, such hand held magnifying glasses may not enlarge sufficiently for the particular purpose at hand.

Still further, many hand held magnifying devices are shaped so as to limit the decorative nature thereof, and thus such devices have an impediment to their full and successful commercial acceptance.

Therefore, there is a need for a hand-holdable magnifier device that is capable of magnifying to high powers, yet does not need a base or other such mounting element whereby the device is easily transported and useable in many varied situations.

OBJECTS OF THE INVENTION

It is a main object of the present invention to provide a hand-holdable magnifier device that is capable of magnifying to high powers.

It is another object of the present invention to provide a hand-holdable magnifier device that is capable of magnifying to high powers, yet does not need a base or other such mounting element whereby the device is easily transported and useable in many varied situations.

It is another object of the present invention to provide a hand-holdable magnifier device that is capable of magnifying to high powers, yet does not need a base or other such mounting element whereby the device is easily transported and useable in many varied situations and is capable of being formed in a decorative manner.

SUMMARY OF THE INVENTION

These, and other, objects are achieved by a hand-holdable magnifying device that includes a telescoping tube in which the ocular portion and the objective portion are mounted, and a base on which a condenser is mounted.

The tube is capable of adjusting the magnification of the device, and still is capable of being decorated or shaped to make the device pleasing in appearance while still functioning as a successful magnifying device in which high powers are achievable.

By including a condenser, the function of the device is improved thereby making it more desirable and useful for those in need of such a device. Such capability can take the device from the realm of a novelty or a toy into the field of scentific devices with many practical applications for scientists and engineers as well as other potential users. In manner, the device's commercial success is not limited.

DETAILED DESCRIPTION OF THE PREFERRED EMBODIMENT OF THE INVENTION

Figure 1:
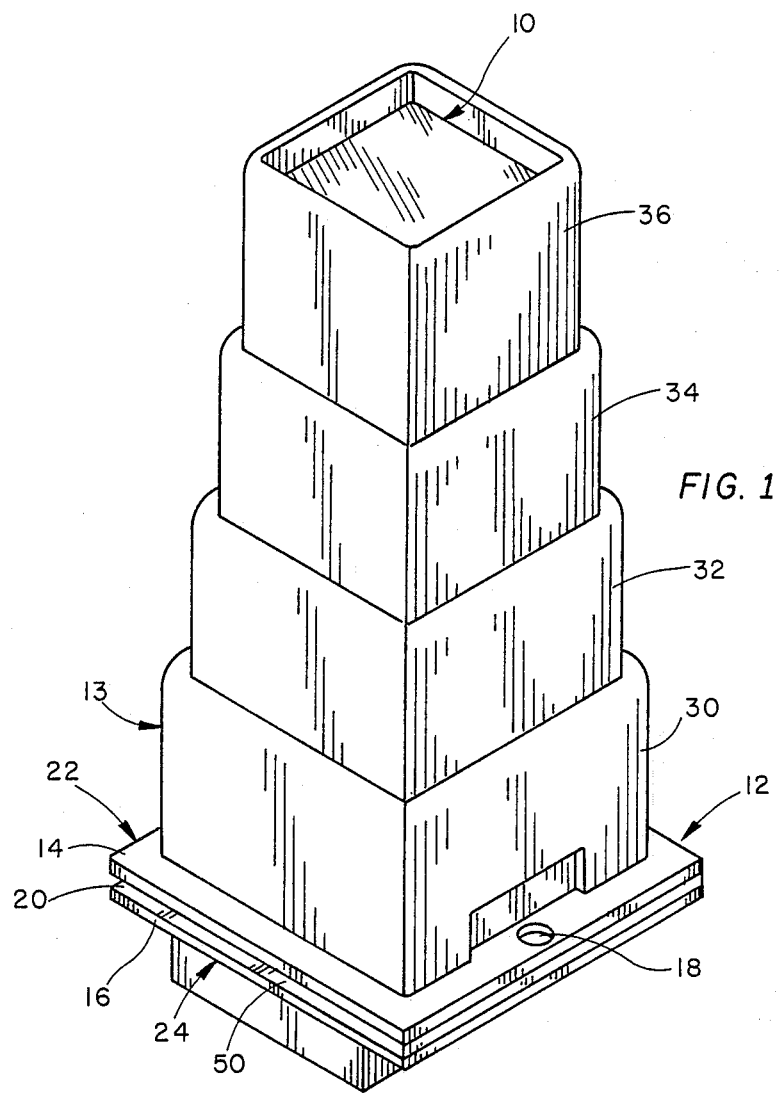
FIG. 1 is a perspective view of a first form of the hand-holdable magnifying device of the present invention in the set up configuration.
Figure 2:
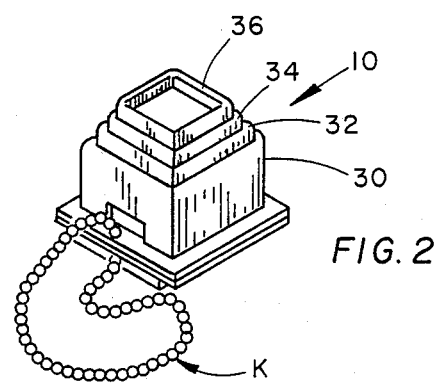
FIG. 2 is a perspective view of the FIG. 1 device in a collapsed configuration.
Figure 3:
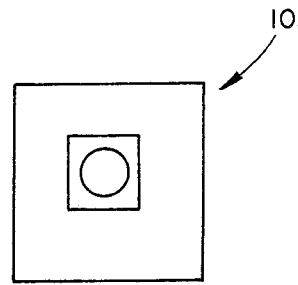
FIG. 3 is a bottom plan view of the FIG. 1 device.

Shown in FIGS. 1, 2 and 3 is a first form of a hand-holdable magnifying device 10 of the present invention. By comparing FIGS. 1 and 2, it is seen that the device can be collapsed into pocket-size. Yet, the device can also be extended as much as necessary to achieve the desired degree of magnification as will be discussed below.

Figure 6:
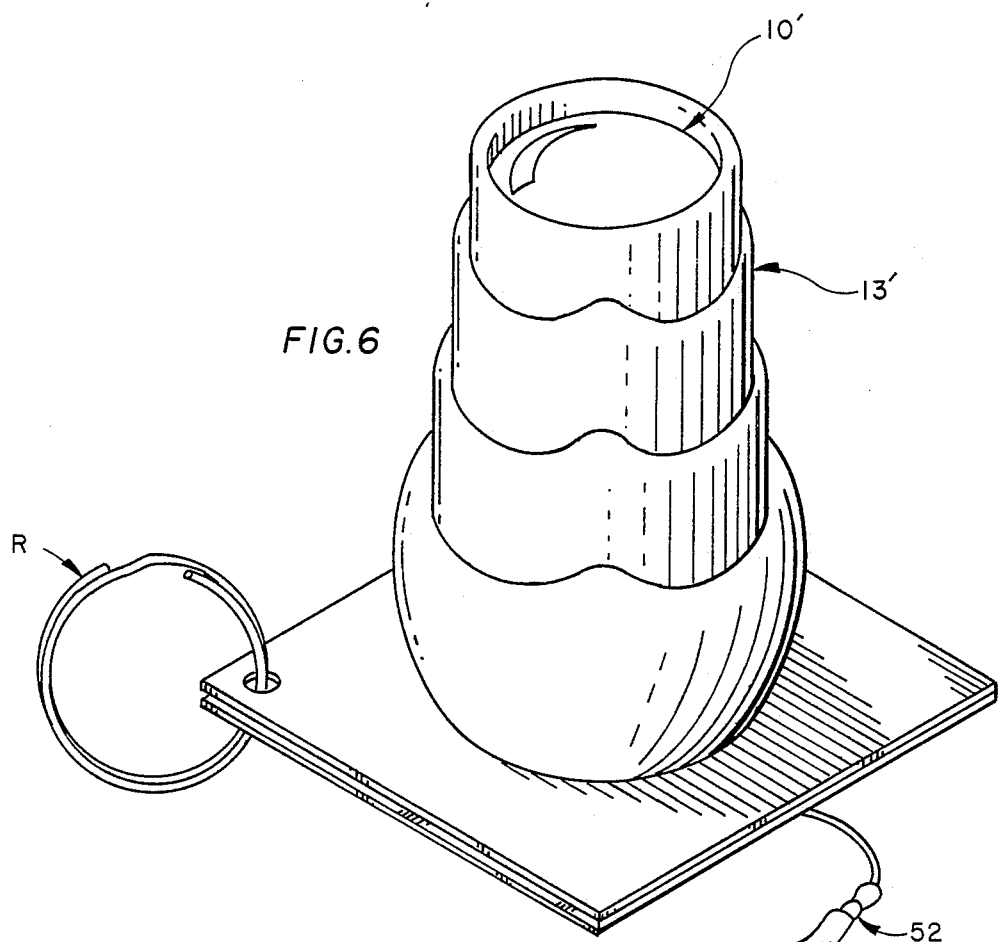
FIG. 6 is a perspective view of another embodiment of the device of the present invention in the set up configuration.
Figure 7:
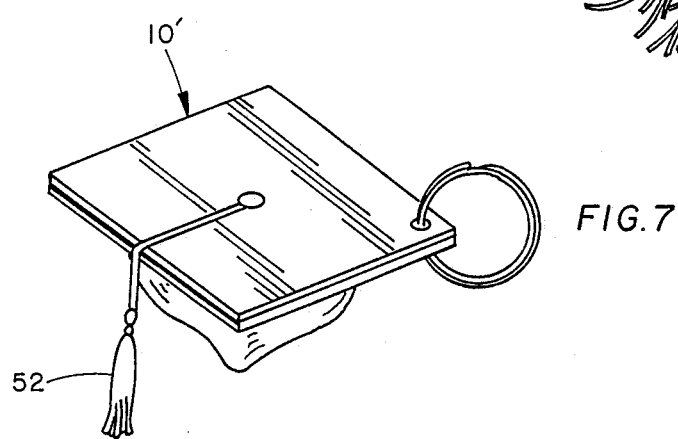
FIG. 7 is a perspective view of the FIG. 6 device in the collapsed configuration.

The device 10 includes a base 12 on which a tube portion 13 is mounted. The base has a first surface 14 that serves as the top surface in the set-up condition of the device, and a second surface 16 that serves as the bottom surface in the set up condition of the device. A hole 18 is defined through the base to accommodate a key chain K, a keyring R (FIGS. 6 and 7) or the like.

The base is divided by an elongate slot 20 into a first portion 22 and a second portion 24, and the slot is sized to accommodate planar objects, such as photographs, pictures, transparencies or the like. The base also includes two openings 26 through which light passes. The openings are concentric and centered on a the longitudinal centerline 28 of the tube portion 13, with one of the openings being defined in portion 20 and the other opening being defined in portion 22 whereby light passes into the device via the light hole defined in portion 22 and into the tube portion 13 via the light hole in portion 24 after passing through any object located in the slot 20.

The tube portion 13 includes a plurality of sections 30, 32, 34 and 36 which are telescopingly connected together to be movable between the fully extended set up configuration shown in FIG. 1 the fully collapsed configuration shown in FIG. 2. The sections of the collapsible tube 13 are frictionally fit together so that the tube can assume any intermediate configuration between the fully extended and the fully collapsed configurations for adjusting the magnifying power of the device 10.

A housing 38 is mounted on surface 16 to depend beneath the light opening defined in the portion 22, and includes a light opening 40 that is located to be concentric with the light openings 26. The purpose of housing 38 will be apparent from the ensuing discussion.

Figure 4:
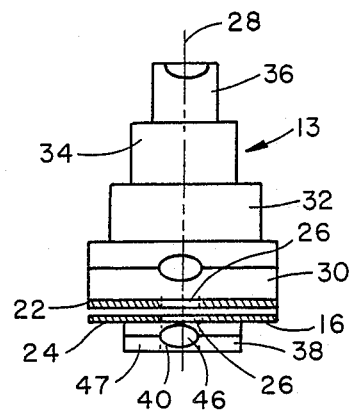
FIG. 4 is a schematic of the FIG. 1 device in the set up configuration showing the lenses and the positions thereof.
Figure 5:
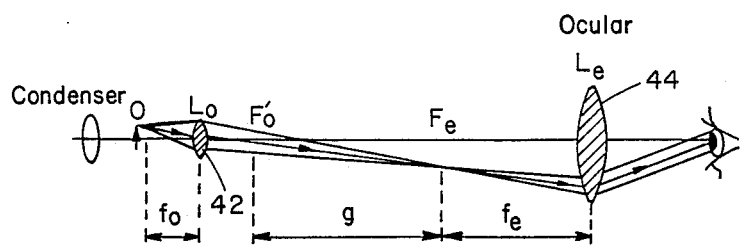
FIG. 5 is a schematic of the lenses of the device.

As best shown in FIGS. 4 and 5, the device 10 includes a lens system for magnifying an object placed in the base via the slot 20. This lens system includes a compound objective 42 of very short focal length $f_1$ and an ocular 44 of focal length $f_1$. The object 0 is Placed adjacent to the objective 42 as shown in FIG. 5. The distance of between the back focus of the objective and the front focus of the eyepiece containing the ocular is always positive and is called the optical tube length. The magnification of the device is a function of the focal lengths of the lenses, and the spacing between such lenses as well as the magnification of the lenses themselves. Thus, by adjusting the spacing between the various lenses, the magnification of the device can be adjusted. This spacing is adjusted by moving the sections of the tube 13.

The device 10 further includes a condenser 46 which serves to direct the light on to the object and to illuminate it intensively and uniformly in such a manner that nearly all of this light is transmitted into the object eyepiece of the device. The condenser is mounted in the housing 38. The condenser and the objective are mounted using spiders 47 or other such mounting means.

The device is amenable to being shaped in a pleasing manner so that the overall commercial acceptance thereof is increased beyond strictly the scientific community. For example, the device 10' can assume the graduation mortarboard shape shown in FIGS. 6 and 7 which includes a tassel 52, yet still include all of the above-discussed features of a scientific optical device. The device 10' differs slightly from the device 10 in that the sections of tube 13' are shaped to assume the motarboard shape shown in FIG. 7, and the condenser and its associated housing are omitted from the device 10'.

It is understood that while certain forms of the present invention have been illustrated and described herein, it is not to be limited to the specific forms or arrangements of parts described and shown.

I claim:

1. A hand-holdable magnifying device comprising:
   (A) an object supporting rectangular base having two sides and two ends, a centerline extending from one end to the other end, a width as measured between the sides, a length as measured between the ends, a top surface, a bottom surface, a center, a thickness as measured between said top and bottom surfaces, a slot defined in the base and extending between said sides and extending from one end and being located between said top and bottom surfaces, said slot dividing said base into a first portion having said top surface thereon and a second portion having said bottom surface thereon, said base further having a light opening defined in each of said first and said second portions, said light openings being concentric with each other and both being centered on said base center, a planar object being viewed being placed in said slot and light passing through said concentric holes passing through that object being viewed;
   (b) a tube mounted on a first side of said base and which includes a plurality of telescopingly connected sections including
      (1) a tubular rectangular bottom section mounted on said base top surface and including
         (a) two side walls extending upwardly from said top surface,
         (b) two end walls extending upwardly from said top surface,
         (c) said bottom section side and end walls being spaced adjacent to corresponding ones of said base sides and ends respectively and inwardly thereof toward said base center,
         (d) said bottom section being hollow and having an inner surface on said base section walls,
      (2) a first rectangular section telescopingly attached to said base section and including
         (a) two side walls extending upwardly from said bottom section side walls,
         (b) two end walls extending upwardly from said bottom section end walls,
         (c) said first section side and end walls being in frictional and sliding engagement with corresponding ones of said bottom section side and ends and being located inwardly thereof toward said base center,
         (d) said first section being hollow and having an outer surface in frictional sliding contact with the bottom section inner surface and having an inner surface,
      (2) a second rectangular section telescopingly attached to said first section and including
         (a) two side walls extending upwardly from said first section side walls,
         (b) two end walls extending upwardly from said first section end walls,
         (c) said second section side and end walls being in frictional and sliding engagement with corresponding ones of said first section sides and ends and being located inwardly thereof toward said base center,
         (d) said second section being hollow and having an outer surface in frictional sliding contact with the first section inner surface and having an inner surface,
      (3) a third rectangular section telescopingly attached to said second section and including
         (a) two side walls extending upwardly from said second section side walls,
         (b) two end walls extending upwardly from said second section end walls,
         (c) said third section side and end walls being in frictional and sliding engagement with corresponding ones of said second section sides and ends and being located inwardly thereof toward said base center,
         (d) said third section being hollow and having an outer surface in frictional sliding contact with the second section inner surface and having an inner surface,
      (4) a fourth rectangular section telescopingly attached to said third section and including
         (a) two side walls extending upwardly from said third section side walls,
         (b) two end walls extending upwardly from said third section end walls,
         (c) said fourth section side and end walls being in frictional and sliding engagement with corresponding ones of said third section sides and ends and being located inwardly thereof toward said base center,
         (d) said fourth section being hollow and having an outer surface in frictional sliding contact with the third section inner surface and having an inner surface, and
      (5) said secitons telescoping together and each having a center which is aligned with said base center; and
   (B) a lens system which includes (1) a condenser lens mounting element attached to said base second portion adjacent to said base bottom surface, (2) a condenser lens mounted in said lens mounting element adjacent to said base aligned openings and being spaced from said base bottom surface, (3) an objective lens mounting element attached to the inner surface of said bottom section and spanning between at least two walls of said bottom section and being located adjacent to and spaced from said base first portion top surface, (4) an objective lens mounted in said objective lens mounting element and being aligned with said aligned openings, (5) an ocular lens mounting element attached to the inner surface of said fourth section, and (6) an ocular lens mounted in said ocular lens mounting element.

2. The device defined in claim 1 further including a key chain attached to said base.

* * * * *